UNITED STATES PATENT OFFICE.

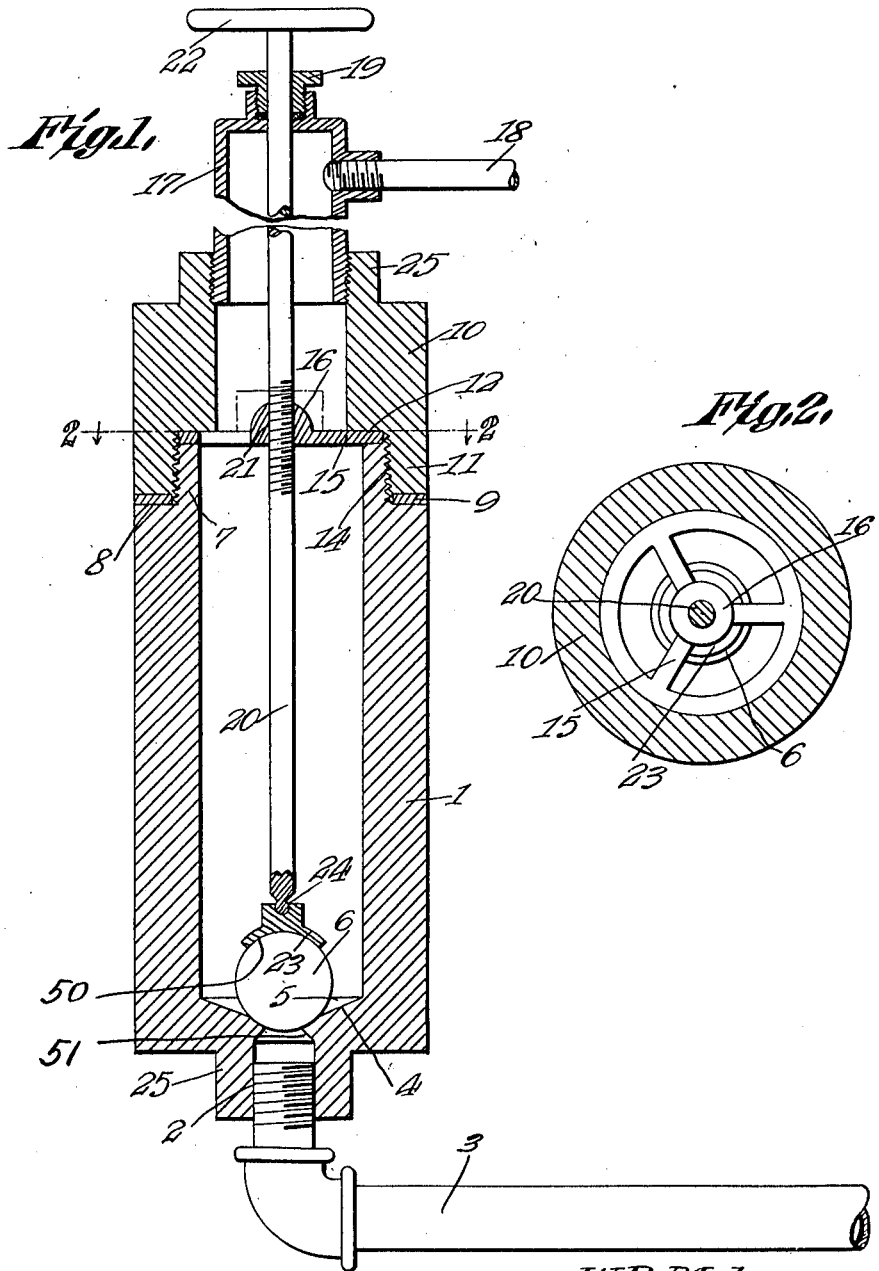

WILLIAM D. MOHR, OF BALDWIN, IOWA.

WATER-CUT-OFF VALVE.

1,311,830.  Specification of Letters Patent.  Patented July 29, 1919.

Application filed August 11, 1917. Serial No. 185,686.

*To all whom it may concern:*

Be it known that I, WILLIAM D. MOHR, a citizen of the United States, residing at Baldwin, in the county of Jackson and State of Iowa, have invented a new and useful Water-Cut-Off Valve, of which the following is a specification.

The device forming the subject matter of this application includes a ball valve, and the invention aims to provide novel means for operating the valve, the construction being such that it may be taken apart and set up readily, to give access to the valve.

Another object of the invention is to provide a device of the type mentioned which may be buried readily in the ground, without forming a pit or inclosure about the valve.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in longitudinal section, a device constructed in accordance with the present invention;

Fig. 2 is a cross section on the line 2—2 of Fig. 1.

In carrying out the invention there is provided a tubular body 1, internally threaded at its lower end, as shown at 2, to receive one end of an inlet pipe 3. Above the threaded portion of the body 1, the same is provided with a beveled seat 4. Above the beveled seat 4, the body 1 is internally provided with a downwardly inclined shoulder 5, constituting means for returning to the beveled seat 4, a ball valve 6 which is adapted to coöperate with the seat. The ball valve 6 preferably is made of rubber. The valve 6 may or may not be buoyant but ordinarily it is solid. The body 1 is provided at its upper end with a reduced neck 7 defining an external shoulder 8 supporting a gasket 9.

The numeral 10 denotes a tubular head provided at its lower end with a flange 11 defining an internal shoulder 12 disposed above the neck 7. The flange 11 is threaded at 14 onto the neck 7. A gasket 9 is bound between the lower end of the flange 11 and the shoulder 8.

The periphery of a spider 15 is bound between the shoulder 12 and the upper end of the neck 7, the spider having a central bearing 16.

A pipe 17 is threaded into the upper end of the head 10 and has a lateral outlet 18. Assembled with the upper end of the pipe 17 is a stuffing box 19. The pipe 17 may be of any desired length, depending on the depth to which the body 1 and the head 10 are buried in the ground. A rod 20 is journaled for rotation in the stuffing box 19, and the latter constitutes a means whereby a leakage of water about the rod will be prevented. The rod 20 is threaded as shown at 21 into the bearing 16 of the spider 15. The upper end of the rod 20 is provided with a handle 22 of any desired sort. A foot 23 is swiveled as shown at 24 on the lower end of the rod 20 and is adapted to coact with the ball valve 6.

When the rod 20 is rotated in one direction, the rod will be advanced, because the same is threaded into the bearing 16 of the spider 15. When the rod is advanced, the foot 23 will coöperate with the ball valve 6 and crowd the same down on the seat 4. In this way a secure closure will be effected, and because the foot 23 is swiveled to the rod 20, the foot will coöperate properly with the ball valve. When the rod 20 is retracted, the ball valve 6 is set free and will rise off the seat 4 due to the action of the liquid entering the body 1 through the pipe 3. The liquid thus delivered into the body 1, traverses the head 10 and the pipe 17 and is delivered through the outlet 18.

It will be obvious that at any time the head 10 may be threaded off the body 1, the spider 15 being lifted out along with the rod 20, whereupon the ball valve 6 may be renewed. The ball valve is practically the only element subject to deterioration, and the construction of the device is such that the ball valve may be renewed without difficulty. If desired, the body 1 and the head 10 may be provided at their ends with wrench faces 25 facilitating the threading together and the separation of these parts.

The foot 23 has a concavity 50 in its lower surface, corresponding to the curvature of the ball 6. When the foot is raised, and when the ball moves upwardly under the force of the liquid, to uncover the opening 51 in the bottom of the body, the ball does not rise in alinement with the axis of the body, but, under the motion of the liquid, tends to move toward the side wall of the body. When the ball thus rises and moves laterally, the ball is received in the concavity 50 of the foot 23, the latter tilting on its swiveled connection with the rod 20. The ball 6, therefore, may be held out of axial alinement with the opening 51, thereby enhancing the flow of water. When, however, the ball is forced downwardly, or moves downwardly by gravity, the inclined seat 4 will return the ball to closed position with respect to the opening 51.

Having thus described the invention, what is claimed is:—

In a device of the class described, a tubular body comprising a lower end wall having an opening, the end wall being provided, about the opening, with a seat which slants downwardly to the opening; a rod mounted in the body for longitudinal movement; a foot having a concavity in its lower surface; and a free ball coöperating with the opening, with the seat, and with the concavity of the foot, the ball being of greater diameter than the distance between the periphery of the foot and the inner wall of the body, the foot being swiveled to the rod for rotation and for tilting movement, whereby when the ball is raised by the liquid, the ball and the foot may move laterally, thereby disposing the ball to one side of the axis of the opening.

In testimony that I claim the foregoing as my own, I have hereto affixed my signature in the presence of two witnesses.

WILLIAM D. MOHR.

Witnesses:
 EDWARD J. RUTENBECK,
 HENRY JANSEN.

Copies of this patent may be obtained for five cents each, by addressing the "Commissioner of Patents, Washington, D. C."